May 28, 1940.   R. L. MALLORY   2,202,218
CONTROL APPARATUS
Filed March 2, 1938   2 Sheets-Sheet 2
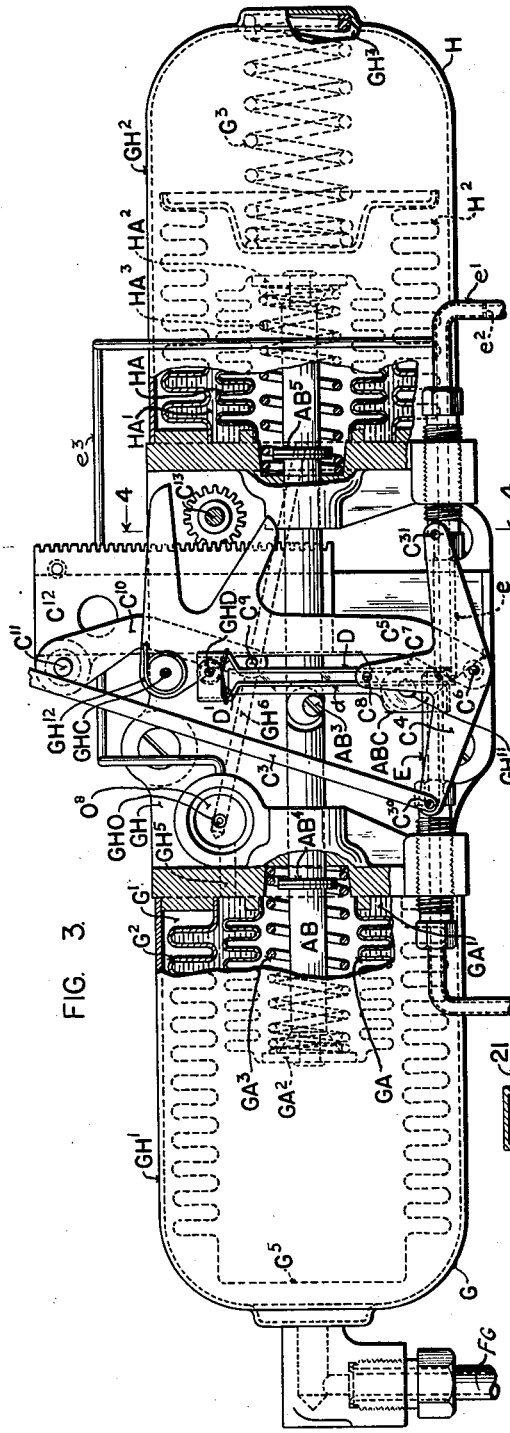
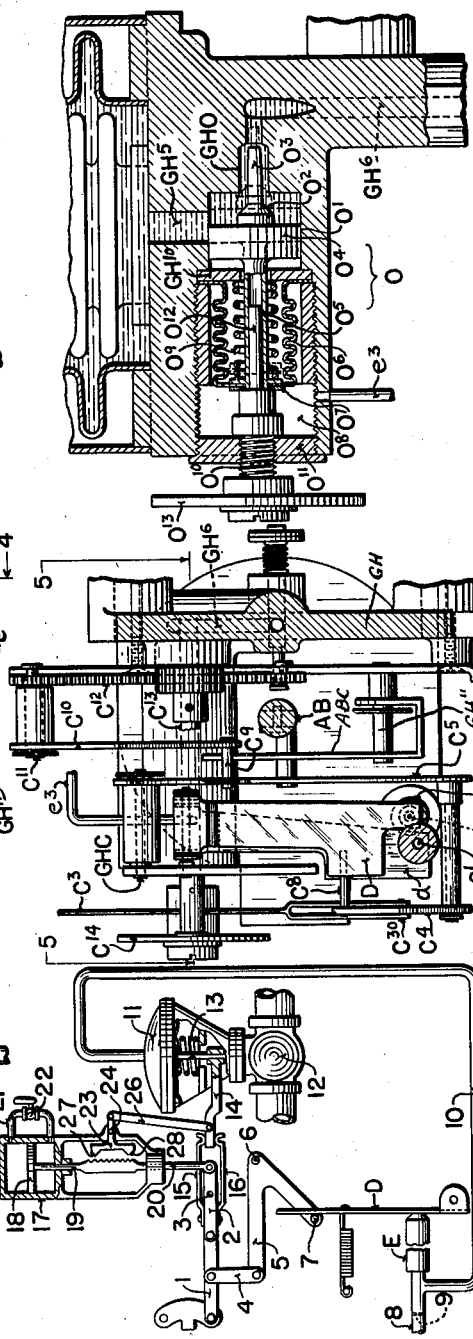
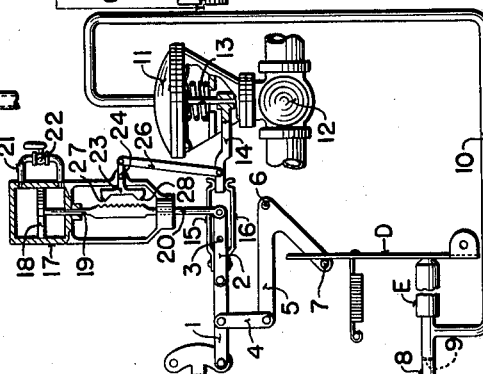
INVENTOR.
ROBERT L. MALLORY
BY *George M. Merchamp*
ATTORNEY.

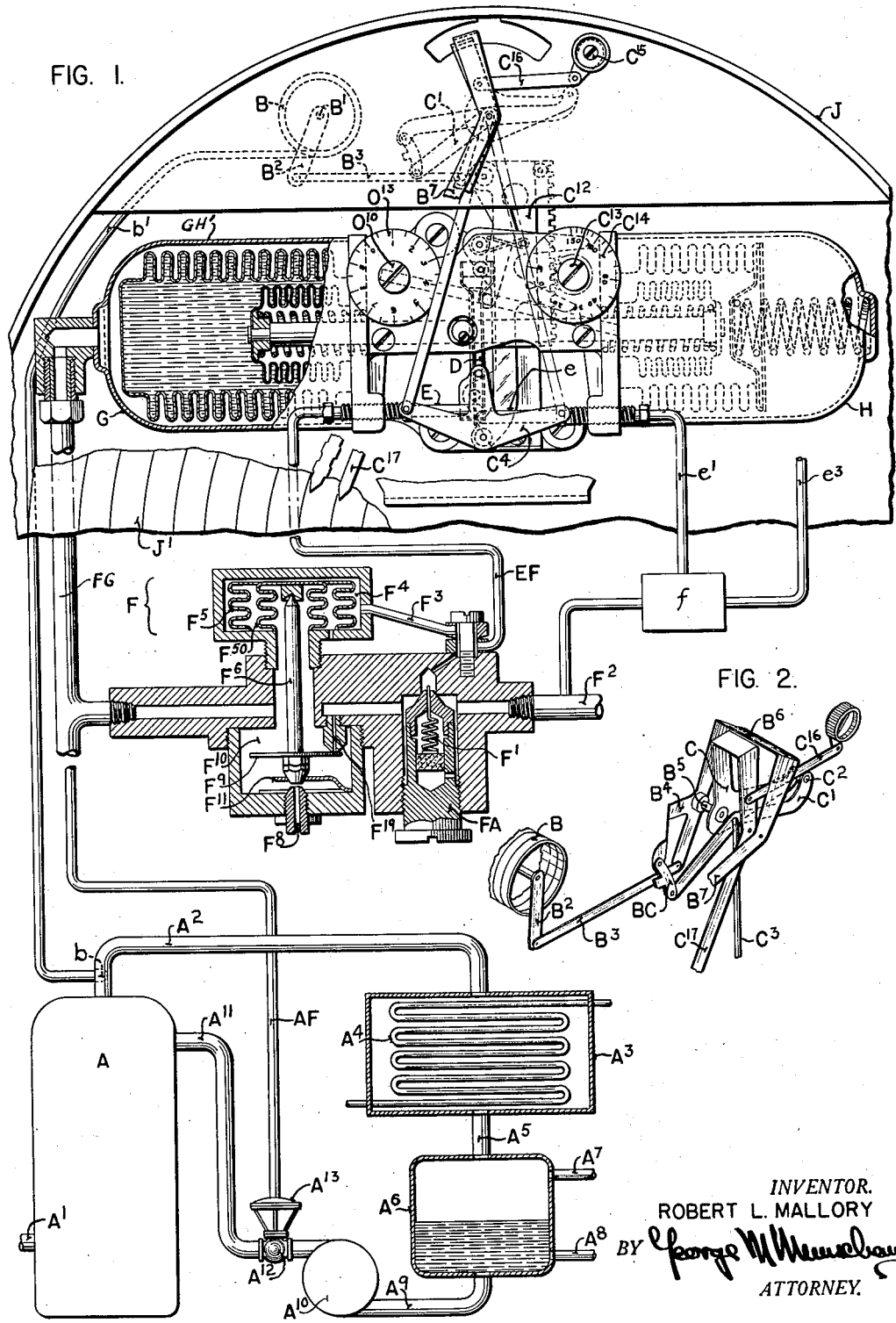

Patented May 28, 1940

2,202,218

UNITED STATES PATENT OFFICE 2,202,218

CONTROL APPARATUS

Robert L. Mallory, Houston, Tex., assignor to The Brown Instrument Company, Philadelphia, Pa., a corporation of Pennsylvania Application March 2, 1938, Serial No. 193,514

11 Claims. (Cl. 236—82)

My present invention comprises improvements in automatic control apparatus including mechanism for automatically effecting an adjustment sometimes referred to as a compensating or resetting adjustment. Typically, such apparatus comprises means automatically responsive to variations in a control quantity, and mechanism which is actuated or adjusted by said means, on the departure of said quantity from a predetermined normal value thereof, to create a control effect tending to return said quantity to its normal value, and which includes compensating provisions automatically effecting a self-adjustment of said mechanism to thereby slowly augment the control effect created on the departure of said quantity from said normal value when the return thereto is delayed. The compensating provisions thus minimize the variations in the control quantity resulting from what may be called load changes in the controlled system or process.

More specifically stated, the general object of the present invention is to provide control apparatus of the type specified, with means whereby its compensating provisions are automatically rendered inoperative under certain conditions, in which the operative results of said provisions may be objectionable.

A specific object of the present invention is to provide improved means for controlling the vapor outlet temperature of a fractionating tower or bubbling still element of an oil refinery cracking unit, by automatically regulating the amount of reflux liquid fed.

A still more specific object of the present invention is to provide a commercial control instrument known as an "Air-O-Line Controller," with simple and effective means for rendering its compensating provisions inoperative under certain special conditions. In recent years, there has been a considerable and generally satisfactory use of a commercial control instrument, known as the "Air-O-Line Controller," for various purposes, including the regulation of the return of reflux liquid to a tower or still, of the kind mentioned above, so as to control the vapor outlet temperature. The Air-O-Line Controller is a control instrument of the type comprising means for maintaining an air pressure control force which is varied in predetermined accordance with a controlling condition, which in the above mentioned control of the return of reflux liquid to a fractionating tower or still, is transmitted to a fluid pressure motor valve thereby adjusted in the direction to increase or decrease the rate of reflux liquid return as the vapor outlet temperature rises above or falls below a predetermined value.

The Air-O-Line Controller includes means for effecting an initial corrective adjustment in an air controller valve commonly called a "flapper" valve, on a change in the controlling condition, and for then quickly effecting a second or "follow-up" adjustment of the flapper valve, neutralizing or eliminating a portion of the initial adjustment, and for thereafter effecting a delayed third or compensating adjustment of the flapper valve, which augments the unneutralized portion of the initial adjustment.

Under what may be regarded as usual operating conditions, the initial adjustment of the Air-O-Line flapper valve, if maintained, would be more than that required to return the controlling condition or quantity to its normal value. The effect of the second adjustment is to avoid a tendency to overcorrection of the controlling quantity, which would otherwise result from the relatively large magnitude of the initial adjustment. The first two adjustments of themselves insure a desirable control under conditions in which the load on the control system or process is maintained at an approximately constant normal value. When that load changes, the first and second adjustments cannot prevent a significant variation in the controlling quantity from its normal value. Thus, for example, if as a result of such a load condition change as an atmospheric temperature change or a change in the rate at which oil and vapors are delivered to a fractionating tower or bubble still, the vapor outlet temperature tends to increase and the rate at which reflux liquid is supplied should be increased correspondingly to that change in load condition. The compensating or reset adjustment provisions of the Air-O-Line Controller tend to effect the adjustment of the control apparatus needed to correct for the disturbing effects of such a load change.

In the use of the Air-O-Line Controller to control the operation of the above mentioned fractionating tower or bubble still, under certain conditions, such as are sometimes experienced in starting a cracking unit into operation, it sometimes happens that the quantity of reflux liquid available for delivery to the tower is not great enough to prevent an increase in the outlet temperature. In such case the continued operation of the compensating or reset provisions may adjust the control apparatus into a condition delaying its proper response to a subsequent decrease in the outlet temperature making it desirable to diminish the rate at which reflux liquid is supplied to the tower. I am able to avoid such undesirable adjustment of the control apparatus, by providing the Air-O-Line Controller with means for rendering its compensating or reset adjustment provisions inoperative, on a certain wide departure of the controlling condition from its normal value.

My improvement, in its broader aspects, is not restricted to use in the Air-O-Line Controller, or to use in air controllers as distinguished from other control apparatus, or to use in the control of a fractionating tower or bubble still, but is adapted for use generally in any control system including automatic compensating, or reset adjustment, provisions, and used under conditions in which overadjustment of said provisions may delay control adjustments desirable when the controlling quantity is returning to its normal value, following a wide departure therefrom.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a somewhat diagrammatic representation of a fractionating or bubble tower and control apparatus associated therewith;

Fig. 2 is a perspective view of a portion of the control apparatus shown in Fig. 1;

Fig. 3 is an elevation, with parts broken away and in section, of a portion of the control apparatus shown on smaller scale in Fig. 1;

Fig. 4 is a section on the line 4—4 of Fig. 3;

Fig. 5 is a section on the line 5—5 of Fig. 4; and

Fig. 6 is a schematic representation of another form of control apparatus.

In the form of the invention diagrammatically illustrated in Fig. 1, A represents a fractionating tower, or bubble still, with an inlet $A'$ for oil and vapors coming to the tower from an oil heater (not shown), in which oil is heated to a cracking temperature. The vapor outlet $A^2$ of the tower, leads from the top of the tower to a condenser $A^3$. The latter is shown as comprising a condensing chamber with a pipe coil $A^4$ therein through which cooling liquid is passed. An outlet $A^5$ leading from the bottom of the condenser $A^3$ opens into a liquid and gas separator $A^6$. The latter is provided with an upper vapor outlet $A^7$, a lower liquid draw-off outlet $A^8$, and a second lower reflux liquid outlet $A^9$. The latter is connected to the inlet of a reflux pump $A^{10}$, delivering reflux liquid to the upper portion of the tower A through a pipe $A''$, at a rate normally determined by the throttling effect of the regulator valve $A^{12}$ in the discharge line $A''$.

As shown, the valve $A^{12}$ is of the fluid pressure motor type, and is adjusted through its full throttling range, i. e. between its wide open and its fully closed positions, by a predetermined variation in the control pressure transmitted by a pipe AF to the motor chamber $A^{13}$ of the valve. That control pressure is the air pressure maintained in the pilot valve chamber $F^{10}$ of a control instrument J, including air controller mechanism, and directly responsive to the pressure of the expansible fluid in a thermometer bulb $b$, which extends into, and provides a measure of the temperature of the vapor outlet $A^2$ of the tower A.

The instrument J, as shown, differs from the previously mentioned, commercial "Air-O-Line Controller", only as a result of its inclusion of a special or auxiliary flapper valve $d$, nozzle $e$ and associated piping, not included in the standard Air-O-Line Controller. The disposition, purpose and effect, of said auxiliary flapper and nozzle are explained herein, following a brief description of the standard Air-O-Line Controller features of the instrument shown, considered desirable herein, although that controller is well known and extensively used commercially in this country, and is fully disclosed in the prior Patent No. 2,125,081 of Coleman B. Moore, granted July 26, 1938.

The instrument J measures, and is shown as adapted to record, the temperature in the vapor outlet conduit $A^2$, in which the thermometer bulb $b$ is located. The instrument J includes a Bourdon tube or helix B, to the stationary end of which the pressure in the bulb $b$ is transmitted by a tube $b'$. As the temperature of the bulb increases and decreases, the pressure in the helix B increases and decreases, and thereby gives counter-clockwise or clockwise movements to an arm $B^2$ which is attached to the free end of the helix and is journalled on a shaft $B'$ coaxial with the helix.

Through operating connections, shortly to be described, angular movements of the arm $B^2$ produce corresponding movements of a pen arm $B^7$, which records the varying value of the vapor outlet temperature on a record chart $J'$ continuously rotated in the usual manner by an instrument chart driving shaft not shown. Each movement of the arm $B^2$ also gives a corresponding movement to a lever $C'$ and thereby to a valve operating lever $C^4$, and the movement of the latter effects a corresponding initial control force adjustment by changing the relative positions of the port containing element and port throttling element of a control valve. The latter, in the particular form shown, comprises a flapper element D movable to variably throttle the nozzle bleed port or passage $E'$ in an element E. A change in the temperature of the bulb $b$ resulting in an angular adjustment of the lever $C^4$ and corresponding movement of the flapper valve D toward or away from the nozzle E, effects an initial change in the pressure in the pilot valve chamber $F^{10}$, which is followed by second, or "follow-up," and by third, or "compensating" adjustments of that pressure. The last mentioned adjustments are produced, not by an angular adjustment of the lever $C^4$, but by a bodily adjustment thereof, effected by fluid pressure actuated means.

The means shown in Fig. 2, through which the oscillatory movements of the arm $B^2$ are transmitted to the pen arm $B^7$ and lever $C'$, comprise a bell crank lever $B^4$ having one arm connected by a link $B^3$ to the arm $B^2$. The lever $B^4$ is journalled on a shaft $B^5$ and is connected to one leg of a yoke member $B^6$, the other leg of which is extended to form the pen arm $B^7$. The movements of the bell crank lever $B^4$ are transmitted to the lever $C'$, by means of a link BC, connecting the lever $B^4$ to one end of the lever $C'$. The normally stationary, but adjustable fulcrum pivot $C^2$ for the other end of the lever $C'$, is carried by a supporting lever C which may be manually adjusted as hereinafter described. The movements of the lever $C'$ are transmitted through a connecting link $C^3$ to the lever $C^4$, to one arm of which the lower end of the link $C^3$ is connected at $C^{30}$. The lever $C^4$ is a floating lever, its fulcrum pivot $C^6$ being carried by a lever $C^5$ journalled on a supporting shaft GHC carried by an instrument frame member GH. An arm $C^7$ of the lever $C^4$ carries a pin $C^8$, which, as seen in Figs. 1 and 3, bears against the left hand side of the flapper D, the latter being journalled on a pin GHD carried by the instrument frame part GH. The flapper is lightly biased, as by means of a spring $D'$, for movement to the left toward the nozzle E.

The control valve port $E'$ receives air under pressure through a pipe EF from a supply pipe $F^2$, to which the pipe EF is connected through a restricted or throttling orifice $F'$. The port $E'$ bleeds air to the atmosphere, to thereby control the pressure in the pipe EF and associated apparatus, more or less rapidly, accordingly as the flapper D is farther away from, or closer to the end of the nozzle E at which the port or passage $E'$ opens to the atmosphere. In the arrangement shown, on an increase in the temperature of the bulb $b$, the lever $C^4$ is turned clockwise about its fulcrum pivot $C^6$, and the pin $C^8$ turns the flapper away from the nozzle E and thereby increases the flow through the port $E'$ and decreases the pressure in the pipe EF. The throttling effect of the flapper D on flow through the port $E'$ depends not only upon the angular position of the lever $C^4$, but on the angular position of its supporting lever $C^5$, which is angularly adjusted, as hereinafter explained, by the mechanism including the hereinafter described elements G and H.

The pressure in the pipe EF is transmitted through a pipe $F^3$ to the chamber $F^4$ to the pilot valve or booster mechanism F. The latter operates automatically to maintain a pressure in its chamber $F^{10}$ which is proportional to the pressure in the pipe EF. The chambers $F^4$ and $F^{10}$ are separated by a movable wall, comprising a bellows $F^5$ and a bellows $F^{50}$, and the movements of said wall adjust valve means directly controlling the pressure in the chamber $F^{10}$. As shown, the bellows $F^5$ has one end fixed to the pilot housing or casing of the pilot valve and has its other end closed and movable. The bellows $F^{50}$ also has one end fixed to the pilot valve housing and has its other and movable end connected to the movable end wall of the bellows $F^5$. The latter is exposed externally to the pressure in the chamber $F^4$, and the bellows $F^{50}$ is exposed internally to the pressure in the chamber $F^{10}$, and the interbellows space is open to the atmosphere throught a bleed port.

A valve stem $F^6$ coaxial with the bellows elements is held by a spring $F^{11}$ in engagement with the common movable end wall of said elements, and as they contract and expand, the stem $F^6$ is moved to close and open a bleed port $F^8$ from the chamber $F^{10}$, and to adjust a valve disc $F^9$, carried by the valve stem $F^6$, to respectively open and close a port $F^{19}$ through which air passes from the supply pipe $F^2$ into the chamber $F^{10}$. As will be apparent, the described axial adjustments of the valve member $F^6$ maintain a pressure in the chamber $F^{10}$ in constant proportion to the pressure in the chamber $F^4$. The restricted passage $F'$ is shown as formed by the bore of a capillary tube mounted in a chambered member FA including a filter through which air passes from the pipe $F^2$ to passage $F'$. The member FA normally closes a bypass about the passage $F'$ between the pipe $F^2$ and the pipe EF, which can be opened by manual adjustment of the part FA to permit of manual control of the pressure in the pilot valve chamber $F^4$, as may be occasionally desired.

As shown, the full area of the end wall of the bellows $F^5$ is approximately five times the area of the portion of that wall common to the bellows $F^5$ and $F^{50}$. In consequence, the pressure maintained in the chamber $F^{10}$ is approximately five times the pressure in the chamber $F^4$. This excess of the pressure in chamber $F^{10}$ over that in chamber $F^4$, or booster action, is desirable to provide ample power for actuating the motor valve $A^{12}$ and the fluid pressure valve control apparatus including the element F and the hereinafter described elements G and H, while at the same time keeping the pressure directly controlled by the movements of the flapper D, desirably low.

From what has already been said, it will be apparent that as the temperature of the bulb $b$ increases, the lever $C^4$ adjusts the flapper D to diminish the pressure transmitted to the pilot valve chamber $F^4$, and thereby proportionally decrease the pressure existing in the chamber $F^{10}$, and transmitted through the pipe AF to the motor chamber $A^{13}$ of the valve $A^{12}$. The valve $A^{12}$ is arranged to decrease and increase its throttling effect on flow of reflux liquid to the tower A through the pipe $A^{11}$, as the control pressure in the chamber $F^{10}$ decreases and increases, respectively. When operating conditions make it desirable to increase and decrease the control pressure in the chamber $F^{10}$ as the bulb temperature respectively increases and decreases, that result may be secured by connecting the lower end of the link $C^3$ to the lever $C^4$ at a point $C^{31}$ which is at the opposite side of the lever fulcrum pivot $C^6$ from the point $C^{30}$.

The previously mentioned elements G and H of the control instrument comprises a shell or casing $GH'$ located at one side of, and supported by the instrument frame part GH. Within the casing $GH'$ is a bellows $G^2$, having one end fixed to the part GH and having its other end closed by an end wall $G^5$ which is free to move in response to variations in the resultant of the forces acting on the bellows. Those forces include the fluid pressure within the bellows, the control pressure in chamber $F^{10}$, transmitted by the pipe FG to the space $G'$ enclosed by the casing $GH'$ and surrounding the bellows $G^2$, and a spring force directly tending to give the bellows $G^2$ a predetermined length. That spring force may be, and as shown is, wholly due to the resiliency of the corrugated wall of the bellows $G^2$. As hereinafter explained, however, the fluid pressure within the bellows $G^2$ includes a component due to the action of a spring $G^3$ which does not, but might be arranged to act directly on the bellows $G^2$.

Within the bellows $G^2$ is mounted a smaller and coaxial bellows GA which has one end attached to the part GH and has its other end closed and free to move in response to variations in the resultant of the forces acting on it. Those forces comprise that due to the pressure of an incompressible liquid, as water or a light oil, which fills the space $GA'$ between the bellows $G^2$ and GA, the pressure of the atmosphere with which the interior of the bellows GA is in free communication, the action of a spring $GA^3$ which opposes the tendency of the bellows GA to contract, and the thrust or pull of a rod AB forming a rigid mechanical connection between the movable closed end $GA^2$ of the bellows GA and the movable closed end $HA^2$ of a bellows HA forming a part of the element H. The spring $GA^3$ acts between the closed end $GA^2$ of the bellows GA and the support GH. Stops $AB^4$ and $AB^5$ fixed to rod AB determine the maximum movement of the latter by their engagement with the opposite sides of the supporting part GH.

The element H is generally similar to the element G, comprising a bellows $H^2$ associated with the bellows HA as the bellows $G^2$ is associated with the bellows GA. Each of the last mentioned bellows and the casing $GH^2$ of the element H are secured to the opposite side of the supporting part GH and of the lever $C^5$, from the element G. The bellows HA and $H^2$ are coaxial with the bellows GA and $G^2$, but the two sets of bellows face in opposite directions, so to speak, so that when the bellows HA and $H^2$ contract or expand, the bellows GA and $G^2$ respectively expand or contract. The bellows $H^2$ is subjected externally to the pressure of the atmosphere, with which the interior of the casing $GH^2$ is in free communication through an opening $GH^3$. The bellows $H^2$ is also subjected to a contracting force by the previously mentioned spring $G^3$ acting between the outer side of the movable end wall of the bellows $H^2$ and the adjacent end of the shell $GH^2$. By the interchangeable use of one or another of a series of springs $G^3$ of different strengths, or tensions, the spring action on the bellows $H^2$ may be varied. A spring $HA^3$ acting between the movable closed end $HA^2$ of the bellows HA and the support GH, opposes the tendency of the bellows HA to contract.

The two interbellows spaces $GA'$ and $HA'$ are in restricted communication through a flow or pressure equalizing connection shown as comprising conduits $GH^5$ and $GH^6$, and an adjustable throttling device O, the adjustment of which determines the character of the third or compensating adjustment, which in the form of the invention results from, follows and neutralizes the control pressure change produced by an initial change in the pressure in the space $G'$, as hereinafter explained more fully. As shown, the device O comprises a cylindrical valve chamber $O'$ formed in the instrument framework part GH. The passage $GH^5$ opens into the chamber $O'$ adjacent the inner end of the latter through a lateral wall of the chamber. The passage $GH^6$ comprises an end portion GHO opening axially into the chamber $O'$ through its inner end wall. The latter is formed with a valve seat at the margin of the passage portion GHO, toward and away from which the bevelled seat engaging end of a valve member $O^2$ moves, as the valve member is adjusted axially in the chamber $O'$. The movable valve member $O^2$ also comprises a tapered throttling portion $O^3$ which cooperates with a passage connecting the passage $GH^6$ with chamber GHO to control the fluid flow between passages $GH^5$ and $GH^6$. The valve $O^2$ prevents jamming of the tapered portion $O^3$ in its working passage, by engaging its valve seat before such jamming can occur.

The valve member $O^2$ also includes portions $O^4$ and $O^5$. The portion $O^4$ is a piston working in the chamber $O'$ and guiding the valve member $O^2$ in its movements. The portion $O^5$ is a tubular stem projection from the outer side of the piston $O^4$, which extends into a coaxial bellows element $O^6$. The latter is of approximately the same diameter as the piston $O^4$ and has its end $O^7$ remote from the piston $O^4$ closed and connected to the corresponding end of the stem $O^5$ and has its end adjacent to the piston $O^4$ secured in the instrument framework part GH in which the chamber $O'$ is formed. The bellows element $O^6$ thus forms a movable partition wall between the chamber $O'$ and a larger and coaxial chamber $O^8$. As hereinafter explained, the auxiliary control pressure which is varied by the adjustment of the flapper valve $d$, is transmitted to the chamber $O^8$ by a pipe $E^3$, so that the position of the piston $O^4$ and the throttling effect of the valve member $O^2$ thus depend, under certain conditions, on the pressure in the chamber $O^8$.

The tendency of the pressure in the chamber $O^8$ to contract the bellows $O^6$ and move the valve member $O^2$ in the throttling direction, is opposed by the pressure controlled by the valve member $O^2$ and by a spring $O^9$. The spring $O^9$ acts between a flange carried by the stem $O^5$ at its outer end, and a collar part $GH^{10}$ anchored in the frame part GH and loosely surrounding the stem $O^5$.

The maximum length of the bellows $O^6$ may be positively varied by the adjustment of a threaded spindle $O^{10}$, which is threaded through a plug $O^{11}$ closing the outer end of the chamber $O^8$, and which forms a stop in a position to be engaged by the movable end wall $O^7$ of the bellows, and thus limit the elongation of the latter. As shown, the member $O^{10}$ is formed with an axial guide portion $O^{12}$ extending into, and in telescopic relation with the stem $O^5$ of the piston member $O^4$. The adjustable spindle member $O^{10}$ is provided at its outer end with a kerf adapted for engagement by a screw driver for manual adjustment purposes. The member $O^{10}$ also carries a dial $O^{13}$ for indicating the adjustment position of the member $O^{10}$. The dial $O^{13}$ may have scale markings calibrated in accordance with the law regulating the rate of flow through the throttling device to the adjustment of the latter, so that the dial reading may indicate the rate of return or compensating movement of the rod AB which determines the third or compensating adjustment of the control pressure.

The lever $C^5$ is biased for angular movement about its supporting pivot GHC in the clockwise direction, as seen in the drawings, by a spring $GH^{12}$, and is permitted to turn clockwise under the action of its bias spring, or is moved in the opposite direction against the action of that spring, by the longitudinal movement of the rod AB connecting the movable ends of the bellows GA and HA. The rod AB acts on the lever $C^5$ through an actuating part $AB^3$ carried by the rod AB, and pressure transmitting means comprising a lever ABC and a pin $C^9$, said means being adjustable to vary the leverage with which the rod AB acts on the lever $C^5$. The adjustment of that leverage varies the effect of the second or follow-up adjustment, and, as is hereinafter more fully explained, thereby varies what may be aptly referred to as the throttling range, or extent of throttling movement of the valve $A^{12}$, produced by a given departure of the bulb temperature from its normal value.

The part $AB^3$ carried by the rod AB is a cylindrical pin mounted on the rod AB for angular adjustment about an axis transverse to the length of the rod and laterally displaced from the axis of the pin. The latter is thus in effect an eccentric pin, which by its angular adjustment, varies the relation between the longitudinal position of the rod AB and the angular position of the lever $C^5$. The lever ABC is mounted on a fulcrum pivot $GH''$ carried by the instrument framework, and extending transversely to the rod $AB$ at one side of the latter. The pin $C^9$ is interposed between the right hand edge of the lever $ABC$ and the left hand edge of the lever $C^5$, as the parts appear in Figs. 1 and 3. Each of those edges extends in a direction generally transverse to the rod $AB$.

The pin $C^9$ is carried by an arm $C^{10}$ depending from a supporting pivot pin $C^{11}$ carried by a plate $C^{12}$. The latter is mounted for sliding movement in a direction transverse to the length of the rod $AB$. At its right hand edge, as seen in Figs. 3 and 4, the plate is formed with rack teeth which are in mesh with a pinion secured to a shaft $C^{13}$ rotatably mounted in the instrument framework. The sliding movement given the plate $C^{12}$ when the shaft $C^{13}$ is rotated, moves the pin $C^9$ toward and away from the fulcrum pivot $GH''$ of the lever $ABC$, and thereby varies the leverage with which the part $AB$ acts on the lever $C^5$ through the lever $ABC$ and the pin $C^9$. At the front side of the instrument, the shaft $C^{13}$ carries a dial $C^{14}$ having scale marks cooperating with a stationary index point to indicate the adjustment depending on the position of shaft $C^{13}$. The latter is formed at its front end with a kerf for manual rotation of the shaft by means of a screw driver.

The adjustment effected by a change in the position of the pin $C^9$ may be conveniently and aptly designated a "throttling range" adjustment. The term "throttling range" as here used, may be defined as the percentage of the total operating range of deflection of the instrument pen arm $B^7$, or analogous measuring element, required for adjustment of the control valve $A^{12}$ between the wide open and fully closed positions of the latter. Thus, if full scale deflection of the pen arm were required for the adjustment of the valve $A^{12}$ between its fully closed and wide open positions, the apparatus would have a throttling range of 100%, and if the valve $A^{12}$ were moved between its fully closed and wide open positions by a pen arm deflection which is one tenth of the full scale deflection of the pen arm, the throttling range would be 10%, and if the apparatus were so adjusted that full scale deflection of the pen arm would be insufficient for the adjustment of the valve $A^{12}$ between its wide open and fully closed positions, the throttling range of the apparatus would be more than 100%.

The throttling range desirable for the control of a particular process, depends on the character of the process and on operating conditions, as is explained in said prior Patent No. 2,125,081. For the tower control use illustrated in Fig. 1, the throttling range may well be of the order of 40%.

In considering the throttling range of the apparatus shown in Fig. 1, it should be borne in mind that the net effect of the first and follow-up adjustments following any particular definite departure of the pen arm from its predetermined normal value position, is a corresponding definite change in the control pressure, and a corresponding definite change in the flow capacity or throttling effect of the valve $A^{12}$. In practice, the latter is desirably of a known type in which the change in the flow capacity produced by a change in the control pressure, is in linear proportion to the last mentioned change.

At this point, attention is directed to the fact that in the operation of apparatus of the form shown in Fig. 1, the second or follow-up adjustment provisions may primarily serve two quite different purposes. Thus, when the apparatus is so calibrated that the follow-up adjustment lags somewhat behind the control pressure change producing it, the initial control pressure change may be appreciably greater than the ultimate change produced by the first and second adjustments. The resultant initial over-adjustment tends to a quick check of the departure of the controlling condition from its normal value, which is highly advantageous in some cases. Secondly, whether the second adjustment lags appreciably behind, or is practically contemporaneous with the initial adjustment, the net effect of the first and second adjustments acting through the pin $AB^3$ is not to turn the flapper valve into a particular spatial position, but to position it in the particular position required for the desired change in the control pressure.

With the form of apparatus shown in Fig. 1, the control effected solely as a result of the initial and follow-up adjustments, is control with a "drooping characteristic." With such control, a departure of the pen arm from its normal value position, resulting, for example, from an increase in the tower load caused by an increased amount of material passing to the tower $A$, will establish a control force minimizing the extent of pen departure produced by the load change, but not tending to fully return the pen arm to its normal position. In other words, reflux return control regulation with a drooping characteristic, tends to the maintenance of a higher reflux return rate with a light average return rate requirement than when the tower load is heavier. Regulation with a drooping characteristic is not peculiar to tower control, but may be had in regulating any automatic process of operation, and is of itself ordinarily desirable, because it tends to regulation stability and the avoidance of hunting.

When as a result of a change in process load, or analogous condition, regulation with a drooping characteristic results in a significant departure of a controlling condition from its normal value, that value may ordinarily be restored by some manual adjustment of the control apparatus. For example, with the form of apparatus illustrated, such restoration may be effected by the hereinafter described means for raising and lowering the pivot $C^2$ for the lever $C$, or by adjustment of the eccentric pin $AB^3$. In the form of apparatus shown in Fig. 1, however, such manual adjustments to restore the normal value of the controlling condition, on departure therefrom resulting from ordinary tower load changes, are made unnecessary by the automatic compensating provisions which operate, in effect, to reset the control apparatus to a new relation of the pen arm and control valve.

The previously mentioned up and down adjustment of the pivot $C^2$, changes the position which the flapper $D$ occupies for any particular angular adjustment of the pen arm $B$ and lever $C^5$, and therefore changes the temperature of the bulb $b$ which the apparatus tends to maintain, and is commonly referred to as a "control point" adjustment. As will be apparent, the same effect on the angular position of the lever $C^4$ may be produced by raising or lowering either end of the lever $C'$, while the other end of the lever remains stationary. The end of the lever $C'$ connected to the pivot $C^2$ may be raised or lowered by angular adjustment of the lever $C$ about its pivotal axis which, as shown, coincides with the axis of the pen arm supporting shaft $B^5$. The lever C may be angularly adjusted by manual angular adjustment of a shaft $C^{15}$ mounted in the instrument framework and frictionally held in any angular position into which it is adjusted. The shaft $C^{15}$ carries a crank arm connected by a link $C^{16}$ to a yoke extension of the lever C, one leg of that extension being prolonged to form an index $C^{17}$ which indicates the control point setting on the scaled chart J'. When the actual value of the controlling condition corresponds to the normal value determined by the control point setting, the ends of the index $C^{17}$ and pen arm $B^7$ indicate the same value on the chart J'.

In considering the operation of the apparatus shown in the drawings, insofar as it has now been described in detail, it is convenient to consider the control operation cycle initiated by a decrease in the tower load, resulting in a decrease in the temperature of the bulb $b$, following a period of stable operation in which the bulb temperature is at a predetermined normal value, and the control pressure in space G' is constant, and has been for a period long enough for the various bellows to assume their normal unstretched lengths, and for the pressures in the two interbellow spaces GA' and HA' to become equal. On the subsequent decrease in the temperature of the bulb $b$, the connections between the Bourdon B and the lever $C^4$, give the latter a counterclockwise adjustment about its fulcrum pin $C^6$ with the result that the flapper D is moved toward the nozzle E and the control pressure in the chamber $F^{10}$ is increased.

An immediate effect of the increase in the control pressure, is the actuation of the motor $A^{13}$ to give a closing adjustment to the control valve $A^{12}$, thereby decreasing the rate of reflux return to the top of the tower A, and consequently reducing the tendency of the return reflux liquid to lower the temperature of the bulb $b$. The increase in control pressure transmitted to the chamber G' by the pipe FG, also produces an immediate contraction of the bellows $G^2$ and GA, the latter moving simultaneously with the bellows $G^2$ to momentarily maintain the previously existing volume of the liquid filling the interbellows space GA'. This initial bellows movement is effected in a period of time too short for the flow of a significant amount of liquid from the space GA' through the throttling device O into the interbellows space HA', although the said bellows contraction necessarily increases the pressure of the liquid in the space GA' and initiates said flow.

The contraction of the bellows GA produces a corresponding expansion of the bellows HA and $H^2$ through the connecting rod AB. The pressure of the atmosphere on the bellows $H^2$ remains constant, regardless of the length of that bellows, but the expansion of the bellows HA and $H^2$ increases the fluid pressure in the space HA' as a result of the opposition to the expansion of the bellows $H^2$, due to its own resiliency and to the action of the spring $G^3$. So far as concerns the initial effect of the pressure increase in G', the increase in fluid pressure in the space HA' is directly significant only as a result of the action of the bellows HA and the rod AB, in opposing the contraction of the bellows GA, and thereby of the bellows $G^2$. The pressure in the inter-bellows space GA' is increased also by the opposition to the contraction of the bellows GA, due to its own resiliency and the action of the spring $GA^3$.

The movement of the rod AB produced by the contraction of the bellows GA, operates through parts $AB^3$, ABC, and $C^9$ to turn the lever $C^5$ counterclockwise, and thereby bodily shift the lever $C^4$ and its pin $C^8$ to the right as seen in Figs. 1 and 3, with the result of effecting the second or follow-up adjustment decrease in the pressure transmitted from the chamber $F^{10}$ to the space G' and valve motor $A^{13}$. The extent of the follow-up adjustment effect on the control pressure obviously depends on the adjustment of the apparatus.

As soon as the pressure of the inter-bellows space GA' is increased as a result of the pressure increase in G', liquid begins to flow from the space GA' into the space HA'. Ordinarily, as previously explained, that flow is too slow to have any significant effect on the pressure in the space GA' during the period required for the completion of the initial and follow-up adjustments. Eventually, however, assuming no further bulb temperature change in the meantime, enough liquid will flow from the space GA' into the space HA' to equalize the pressures in the two spaces, and to permit the bellows GA to expand, and the bellows HA to contract to their normal lengths. The time required for pressure equalization depends in part upon the extent of the initial contraction of the bellows GA, and in part on the throttling effect of the device O, which may be adjusted by means of the part $O^{10}$ as has been explained.

As the bellows GA and HA slowly return to their normal lengths, the rod AB is moved slowly to the left, thereby returning the pin $AB^3$, pin $C^9$, and lever $C^5$ to their normal or stable operation positions. This slowly effected return movement of the lever $C^5$ gives the flapper D its third or compensating adjustment and neutralizes the effect of the second or follow-up adjustment on the flapper position. On the assumption that the original decrease in bulb temperature resulted from a decrease in the tower load, and that the latter remains constant at its new value, the subsequent compensating adjustment will continue under the conditions of operation contemplated as normal are restored or until the bulb temperature is returned approximately to its normal value, and the apparatus is stabilized with the bellows GA and HA at their normal lengths but with the control pressure in the space G' and in the pressure motor $A^{13}$, higher than at the commencement of the control operation just described.

For steady operation with varying tower loads, it is theoretically necessary that the flapper D should occupy a different position for each different tower load. In consequence, if the tower load during and at the end of the assumed operating cycle is less than it was just prior to the beginning of the cycle, the control pressure must be higher at the end of the cycle than it was immediately prior to the beginning of the cycle, and at the end of the cycle the temperature of the bulb $b$ must be below its former and assumed normal value. In practice, however, with control apparatus of the type illustrated, which is properly designed and calibrated for the conditions of operation, and with different tower loads within a range of load variation which is not too wide, the difference between the stable bulb temperatures obtained in normal operation, will be too slight to have measurable or other practical significance.

It hardly needs to be pointed out that in an operating cycle initiated by an increase in the temperature of the bulb $b$, control actions are effected which are precisely analogous, though respectively opposite in direction, to the actions occurring in a cycle initiated by a decrease in the bulb temperature.

In accordance with the present invention, provisions including the previously mentioned auxiliary flapper $d$ and nozzle $e$, are made for automatically varying the fluid pressure in the chamber $O^8$ of the device $O$, so as to thereby modify or interrupt the compensating adjustment of the apparatus under certain conditions. As a result of its inclusion of those novel provisions, the control instrument shown in Fig. 1 possesses novel operating characteristics, and is free from operative faults which the Air-O-Line controller may develop under certain special operating conditions.

The auxiliary flapper valve $d$ is adjusted by the main flapper adjusting pin $C^8$, which holds the flapper $d$ out of operative throttling relation with the bleeder nozzle $e$, except when the pin $C^8$ is to the right of any position in which it permits the main flapper valve $D$ to be in operative throttling relation with the nozzle $E$. The nozzle $e$ is continuously supplied with air from a source of air under pressure, through a restricted orifice. The latter may, as shown in Fig. 3, be an orifice $e^2$ located in a pipe $e'$, by which the nozzle $e$ is directly connected to a source of air under pressure, such as the pipe $F^2$. Alternatively, as shown in Fig. 1, the nozzle $e$ may be connected to the supply $F^2$ by the pipe $e'$ and a pilot valve mechanism $f$, exactly like the pilot valve mechanism $F$. As shown in Fig. 3, the pipe $e^3$ connects the chamber $O^8$ of the device $O$ to the pipe $e'$ at the outlet side of the orifice $e^2$. In Fig. 1, the chamber $O^8$ is connected by the pipe $e^3$ to the amplified pressure chamber of the mechanism $f$, corresponding to the chamber $F^{10}$ of mechanism $F$. The arrangement of Fig. 1 thus provides more power for closing the valve $O^2$, than is available when the pilot valve or booster mechanism $f$ is not used. The apparatus is preferably so proportioned and arranged, that a very slight movement of the pin $C^8$ to the right of the position required to initiate the throttling relation of the flapper $d$ and nozzle $e$, will build up the pressures in the nozzle $e$ and chamber $O^8$ sufficiently to close the valve $O^2$, and thus terminate the further compensating adjustment movement of the rod AB to the right, which otherwise would ordinarily occur unless prevented by a decrease in the temperature of the bulb $b$.

The described interruption of the compensating action is of especial practical importance, in the operation of the control apparatus shown in Fig. 1, during periods in which condensate does not collect in the receptacle $A^6$ rapidly enough to permit reflux liquid to be supplied to the tower A rapidly enough to keep the temperature of the bulb $b$ down to its normal value. That condition may and occasionally does occur in starting such refining apparatus as is shown in Fig. 1, into operation initially, or following a shut-down for cleaning or repairs. The resultant maintenance of a temperature of the bulb $b$ in excess of its normal temperature, increases the load on the condenser $A^3$ and tends to temporarily continue the insufficiency in the reflux liquid supply. Eventually, condensate begins to collect in the receptacle $A^6$ rapidly enough to permit of the contemplated maximum flow through the valve $A^{12}$ when the latter is in its wide open position, and the return of the temperature of the bulb $b$ into its normal range of variation.

In the meantime, however, but for the special provisions above described for interrupting the compensating adjustment, the rod AB would have been adjusted so far to the right, before the bulb temperature returned to its normal range, that when that return occurred, the flapper $D$ would be appreciably to the right of the position in which it has any effect on the pressure in the nozzle $E$. In consequence, an initial counter-clockwise adjustment of the lever $C^4$ following said return, is not effective to increase the pressure in the nozzle $E$, and the rate of reflux liquid return cannot be reduced as quickly as is desirable. With control apparatus not operative to reduce the rate at which condensate is returned to the tower as soon as the bulb temperature thus comes down into the control range, there may then be a reduction in the bulb temperature to a temperature below the lower limit of the control temperature range, and a consequent tendency to an over-compensating adjustment of the rod AB to the left, whereby when the bulb temperature eventually again rises into the control range, the apparatus will be inoperative to increase the rate of reflux return as rapidly as is then desirable. As those skilled in the art will understand, the over-compensating adjustment actions described tend to repeated and objectionable bulb temperature swings, or "hunting," which may be avoided by the use of the present invention.

The position of the pin $C^8$ permitting the flapper $d$ to throttle the nozzle $e$ sufficiently to temporarily render the compensating provisions inoperative, is jointly dependent on the angular adjustment of the lever $C^4$ and on the longitudinal adjustment of the rod AB at the time. If the pin $C^8$ is moved into the position terminating the compensating action as a result of a relatively sudden and substantial increase in the control temperature, the rod AB will be relatively widely displaced to the left from its normal balanced position, and the clockwise adjustment of the lever $C^4$ will be appreciably greater than when the pin $C^8$ is moved into said position as a result of a relatively slow and continuous increase in the bulb temperature. In the latter case, the displacement of the rod AB to the left of its normal balanced position may be relatively quite small. From one point of view, the advantage obtained by interrupting the compensating action as described, increases with the extent of displacement at the time, of the rod AB from its normal or balanced position. It is to be noted, however, that the need for the effect obtainable as a result of a relatively wide displacement of the rod AB from normal when the compensating means are rendered inoperative, is ordinarily much greater when the control quantity is fluctuating rapidly and widely, than when its variation is in the nature of a slow drift.

With the apparatus shown in Figs. 1–5, operating as above described, the compensating action is interrupted only as a result of conditions resulting in the reduction of the control pressure to its minimum, with the adjustment of the valve $A^{12}$ into its open position. Such regulation of the compensating adjustment capacity of the control instrument shown, is practically suitable and adequate for the control of the vapor outlet temperature of the apparatus shown in Fig. 1. For some other uses, it may be desirable and adequate to interrupt the compensating action of such a control instrument as is shown herein, only when the value of the control quantity is such that the flapper D exerts its maximum throttling effect on the nozzle E. That result may be secured with the apparatus shown, by connecting the link C³ to the right hand end of the lever C⁴, at C³¹. The principles of my present invention are adapted for use, also, under conditions making it desirable to interrupt the compensating action whenever the control quantity reaches or passes beyond either end of the control range in which its variation results in a corrective control action.

As previously indicated, also, my invention is adapted for use in air controllers and other control apparatus very different in character from the Air-O-Line controller. For example, the invention may be used in connection with control apparatus such as that schematically illustrated in Fig. 6, which includes nothing corresponding to the above mentioned elements G and H, or operative to effect follow-up adjustments. In Fig. 6, a floating lever 1, is adapted to have its left hand end given up and down adjustments in response to decreases and increases, respectively, in a controlling condition, exactly as the Bourdon tube B of Fig. 1 gives up and down adjustments to the left hand end of the lever C' shown in that figure. At its right hand end, the lever 1 is pivotally connected to a lever 2, having a stationary fulcrum pivot 3. A link 4 having its upper end pivotally connected to the lever 1, as the link C³ is connected to the lever C' of Fig. 1, has its lower end pivotally connected to a flapper valve adjusting lever 5. The latter is pivoted to turn about a stationary pivot pin 6.

When the left hand end of the lever 1 is raised as a result of a change in the control quantity, the lever 5 is given a clockwise adjustment, and its flapper engaging pin 7 moves in the direction to permit spring bias movement of the flapper valve D toward the cooperating nozzle E. The latter receives air under pressure from a supply pipe 8, through a restricted orifice 9. The pressure in the nozzle E is thus increased by an up movement of the link 4, and on a down movement of that link, and resultant counterclockwise adjustment of the lever 5, the pressure in the nozzle E is reduced.

The pressure in the nozzle E of Fig. 6, is transmitted by the pipe 10 to the pressure chamber 11 of a fluid pressure actuated regulator 12, which may be like the control valve A¹² of Fig. 1. An increase or decrease in the nozzle pressure transmitted to the chamber 11 gives a corresponding down or up movement to the stem or rod 13 which connects the diaphragm wall of the chamber 11 to the operating member of the valve 12. In the arrangement shown in Fig. 6, the up and down movements of the stem 13 are employed to give compensating angular adjustments to the lever 2, on and the movement of the stem 13 into either limit of its range of movement, so that the valve 12 is then wide open or fully closed, the stem actuates means for holding the lever against angular adjustment until the stem 13 moves back from its limit position.

The operating connections through which the stem 13 adjusts the lever 2, comprise an arm 14 rigidly connected to the stem 13, and upper and lower spring arms 15 and 16 secured to the lever 2, and adapted to engage the upper and lower sides of the arm 14. Except when its movement carries it into the corresponding end position, each up movement of the stem 13 operates through the arms 14 and 15 to effect a slow counterclockwise adjustment of the lever 2, and each down movement of the stem 13 operates through the arms 14 and 16 to give a slow clockwise adjustment to the lever 2. The adjustment movements of the lever 2 are retarded and caused to lag behind the corresponding movements of the stem 13, by dashpot means 17 shown as comprising a stationary dashpot cylinder, the piston 18 of which has its stem 19 connected through a link 20 to the lever 2. A pipe connection 21 between the upper and lower ends of the cylinder 17 including a throttling valve 22, provides for the flow of oil or other dashpot fluid from one end of the cylinder 17 to the other at a suitably slow rate which may be varied by adjustment of the throttling device 22.

In the operation of the apparatus shown in Fig. 6, an up movement given to the left hand end of the lever 1 by a change in one direction of the control quantity, results in a clockwise adjustment of the lever 5, and an increase in control pressure in the nozzle E. That pressure increase, transmitted by the pipe 10 to the chamber 11 of the valve 12 gives a down movement to the stem 13 and its arm 14'. As the arm 14 moves downward, it depresses the free end of the spring arm 16 and subjects the lever 2 to a spring tension force tending, and ultimately effective, to produce a clockwise adjustment of the lever 2. The spring arm 16 yields to permit that adjustment to be retarded by the action of the dashpot 17, the extent of the retardation depending on the adjustment of the bypass valve 22. Conversely, on a change in the opposite direction of the control quantity, producing a down adjustment of the left hand end of the lever 1, the pressure in the nozzle E is reduced, the stem 13 moves upward and its arm 14 puts the spring arm 15 under a tension resulting in a counterclockwise adjustment of the lever 2, which is retarded by the dashpot 17.

Since an up or down movement of the left hand end of the lever 1, thus results in a delayed up or down movement, respectively, of the right hand end of the lever 1, each such last mentioned movement is a true compensating adjustment, and has the same sort of effect on the ultimate control action, as does a longitudinal movement of the rod AB of Fig. 1, which results from the flow of liquid past the throttling device O between the inter-bellows spaces GA' and HA'.

To render its compensating provisions inoperative when the control pressure reaches either end of the control range required for the adjustment of the valve 12 between its wide open and fully closed positions, the apparatus shown in Fig. 6 includes locking means actuated by the arm 14 to hold the lever 2 stationary when the valve 12 is fully closed or wide open. The said locking provisions, are shown as comprising a locking lever 23, pivotally connected at 24 to the cylinder of dashpot 17, and providing a sliding bearing for the outer end portion of the stem 19. One arm of the lever 23 is connected by the link 26 to the arm 14. The other arm of the lever 23 is provided with upper and lower locking shoulders or edges 27 and 28. In intermediate adjustments of the valve 12, both shoulders 27 and 28 are held out of operative engagement with the stem 19, but when the valve stem 13 moves to the upper limit of its movement, the upper shoulder 27 is turned into locking engagement with the stem 19, and when the stem 13 is moved to the lower limit of its movement, the lower locking shoulder 28 is turned into locking engagement with the stem 19. To insure against slippage, the side of the stem 19 engaged by the shoulders 27 and 28, may be roughened, as indicated.

Alternatively if desired, the movement of lever 23 may be adapted to open a valve through the piston 18 or to close valve 22, thereby preventing further movement of piston 18.

The invention is not only adapted to give special advantages in particular control uses, but is generally useful in any control system, in which the load and control conditions are such that from time to time, the control quantity will attain a value larger than the maximum, or smaller than the minimum, of the control quantity values included within the control range. For example, in an ordinary furnace temperature control system in which the control temperature may vary under abnormal conditions from zero up to 1000°, the control apparatus may well be designed and adjusted to normally maintain the temperature within a control range varying from 895° to 905°. In such case, it will ordinarily be highly advantageous to employ control apparatus including compensating provisions which are operative when the control temperature is within the control range, and which are rendered inoperative, in accordance with the principles of the present invention, when the control temperature is below 895° or above 905°.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a control system, the combination with means responsive to variations in a control quantity, of mechanism adjusted by said means on a departure of said quantity from a predetermined normal value thereof to create a control effect tending to return said quantity to its normal value, said mechanism comprising provisions for the automatic adjustment of said mechanism to thereby augment the control effect when the return of said quantity to normal is delayed, and automatic means for rendering said compensating provisions inoperative to further augment said control effect during the time said departure exceeds a predetermined amount.

2. In a control system, the combination with means responsive to variations in a control quantity, of mechanism adjusted by said means on a departure of said quantity in either direction from a predetermined normal value thereof to create a control effect tending to return said quantity to its normal value, said mechanism comprising provisions for the automatic adjustment of said mechanism to thereby augment the control effect when the return of said quantity to normal is delayed, and automatic means for rendering said compensating provisions inoperative to further augment said control effect during the time said departure from normal in either direction exceeds a predetermined amount.

3. The combination with control apparatus comprising a fluid pressure control valve adapted to be adjusted between wide open and fully closed positions by the variation in a control pressure between predetermined limits, and comprising air controller mechanism including a flapper valve mechanism, compensating means, and means responsive to a variable control condition for adjusting said mechanism to thereby vary said control pressure between operative limits, and comprising automatic means for rendering said compensating means inoperative when the control pressure is maintained at one of its operative limits.

4. The combination with control apparatus comprising a fluid pressure control valve adapted to be adjusted between wide open and fully closed positions by the variation in a control pressure between predetermined limits, and comprising air controller mechanism including a flapper valve mechanism, compensating means, and means responsive to a variable control condition for adjusting said mechanism to thereby vary said control pressure, and comprising automatic means for rendering said compensating means inoperative when the control pressure is maintained at either of its operative limits.

5. Fluid pressure control apparatus comprising a pressure space containing an elastic fluid under regulable pressure, means responsive to said pressure for controlling a variable condition, a valve adjustable to regulate said pressure, means for adjusting said valve in response to changes in said variable condition, and means for adjusting said valve in response to a change in said pressure, the last mentioned means comprising a member adapted to contract and expand in accordance with changes in said pressure, a second expansible and contractible member uniting with the first mentioned member to form an enclosed space, a third expansible and contractible member, a rigid connection between said second and third members, a fourth expansible and contractible member uniting with said third member to provide a second enclosed space and exposed to atmospheric pressure at its side external to said space, and a regulable flow passage connecting said enclosed spaces, and automatic means actuated on and as a result of a particular adjustment of said valve to close said flow passage.

6. Fluid pressure control apparatus comprising a pressure space containing an elastic fluid under regulable pressure, means responsive to said pressure for controlling a variable condition, a valve adjustable to regulate said pressure, means for adjusting said valve in response to changes in said variable condition, means for adjusting said valve in response to a change in said pressure, the last mentioned means comprising a member adapted to contract and expand in accordance with changes in said pressure, a second expansible and contractible member uniting with the first mentioned member to form an enclosed space, a third expansible and contractible member, a rigid connection between said second and third members, a fourth expansible and contractible member uniting with said third member to provide a second enclosed space and exposed to atmospheric pressure at its side external to said space, and a regulable flow passage connecting said enclosed spaces, a fluid pressure actuated valve adapted to close said passage, and means for subjecting the last mentioned valve to a passage closing actuating pressure when the first mentioned valve is adjusted into a predetermined position, the last mentioned means comprising a third valve subject to adjustment by the second and third mentioned means.

7. Fluid pressure control apparatus comprising a pressure space containing an elastic fluid under regulable pressure, means responsive to said pressure for controlling a variable condition, a valve adjustable to regulate said pressure, means for adjusting said valve in response to changes in said variable condition, means for adjusting said valve in response to a change in said pressure, the last mentioned means comprising a member adapted to contract and expand in accordance with changes in said pressure, a second expansible and contractible member uniting with the first mentioned member to form an enclosed space, a third expansible and contractible member, a rigid connection between said second and third members, a fourth expansible and contractible member uniting with said third member to provide a second enclosed space and exposed to atmospheric pressure at its side external to said space, and a regulable flow passage connecting said enclosed spaces, and means actuated on the attainment of a particular pressure in said space to close said flow passage.

8. In control apparatus, means for creating a variable control pressure comprising a valve mechanism regulating said pressure and including a valve actuator movable between limits in opposite directions to respectively increase and decrease the control pressure, means for adjusting said actuator in one direction or the opposite direction in accordance with an increase or decrease, respectively, in a control quantity, compensating means tending, on each variation in the control pressure, to give a retarded adjustment movement to said actuator in the direction to create a further control pressure change in the same direction, and means actuated to interrupt the operation of said compensating means by the adjustment of said actuator to one of its limits.

9. In control apparatus, means for creating a variable control pressure comprising a valve mechanism regulating said pressure and including a valve actuator movable to adjust said mechanism between operative limits, means for adjusting said actuator in one direction or in the opposite direction in accordance with an increase or decrease, respectively, in a control quantity, compensating means tending, on each variation in the control pressure, to give a retarded adjustment to said actuator in the direction to create a further change in the control pressure in the same direction, and means including a second valve mechanism actuated by said actuator to interrupt the operation of said compensating means following the adjustment of the first mentioned valve mechanism to one of its operative limits.

10. In control apparatus, means for creating a variable control pressure comprising a valve mechanism regulating said pressure and including a nozzle, a flapper and an actuator, movable transversely of said flapper to adjust the latter in opposite directions between operative limits, means for adjusting said actuator in one direction or in the opposite direction in accordance with an increase or decrease, respectively, in a control quantity, compensating means tending on each variation in the control pressure to give a retarded adjustment movement to said actuator in the direction to create a further control pressure change in the same direction, and means through which said compensating means are rendered inoperative by the adjustment of said actuator in one direction in excess of the amount required to adjust said flapper to its corresponding operating limit, the last mentioned means comprising a second nozzle and a second flapper adapted to be operatively adjusted relatively to said second nozzle by said actuator on the last mentioned adjustment of the latter.

11. In a control system, the combination with means responsive to variations in a control quantity, of mechanism adjusted by said means on a departure of said quantity from a predetermined normal value thereof to create a control effect tending to return said quantity to its normal value, said mechanism including an element adapted to control said quantity which is adjustable by said mechanism through a range of movement in which said quantity is affected, and comprising provisions for the automatic adjustment of said mechanism to thereby augment the control effect when the return of said quantity to normal is delayed, and automatic means for rendering said compensating provisions inoperative to further augment said control effect during the time said mechanism tends to move said element beyond said range.

ROBERT L. MALLORY.